(12) United States Patent
Fukui et al.

(10) Patent No.: US 7,722,260 B2
(45) Date of Patent: May 25, 2010

(54) OPTICAL CONNECTOR AND METHOD FOR ASSEMBLING OPTICAL CONNECTOR

(75) Inventors: Junji Fukui, Yokohama (JP); Wataru Sakurai, Yokohama (JP); Mitsuaki Tamura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 3 days.

(21) Appl. No.: 12/149,463

(22) Filed: May 1, 2008

(65) Prior Publication Data

US 2008/0279508 A1 Nov. 13, 2008

(30) Foreign Application Priority Data

May 2, 2007 (JP) .......................... P2007-121772

(51) Int. Cl.
*G02B 6/38* (2006.01)
(52) U.S. Cl. .......................................... 385/60; 385/72
(58) Field of Classification Search ................... 385/60, 385/72
See application file for complete search history.

(56) References Cited

U.S. PATENT DOCUMENTS

| 6,464,408 | B1 | 10/2002 | Nolan |
| 2002/0057870 | A1 | 5/2002 | Dean, Jr. et al. |
| 2005/0069264 | A1 | 3/2005 | Luther et al. |
| 2006/0204178 | A1 * | 9/2006 | Theuerkorn et al. .......... 385/59 |

FOREIGN PATENT DOCUMENTS

| EP | 0 836 104 A1 | 4/1998 |
| EP | 0 936 484 A1 | 8/1999 |
| JP | 6-034845 | 2/1994 |
| JP | 11-305075 | 11/1999 |
| JP | 2000-304978 | 11/2000 |
| JP | 2007-279415 | 10/2007 |

OTHER PUBLICATIONS

European Search Report issued in European Patent Application No. EP 08 00 8377, mailed Sep. 3, 2008.

* cited by examiner

*Primary Examiner*—Jerry T Rahll
(74) *Attorney, Agent, or Firm*—McDermott Will & Emery LLP

(57) ABSTRACT

To provide an optical connector that enables the reduction in the number of parts and can be easily attached to an optical cable, a concave portion 18 for a ferrule is formed in a plug housing 6, and a ferrule 3 is inserted from the side of a collar portion 10 into the concave portion 18 for a ferrule. A hook portion 28 for a ferrule is provided in a protruding condition inside the plug housing 6. The collar portion 10 is guided by the hook portion 28 for a ferrule, which has been elastically deformed, and moves toward a bottom surface 26 of the concave portion 18 for a ferrule. Where the collar portion 10 reaches a space between the bottom surface 26 and the hook portion 28 for a ferrule, the hook portion 28 for a ferrule is elastically restored. Therefore, even if the collar portion 10 tries to move toward an opening 24 of the concave portion 18 for a ferrule, the collar portion is locked by the hook portion 28 for a ferrule and the movement is inhibited. Thus, in the plug-type optical connector 1, the ferrule 3 can be positioned by inserting into the plug housing 6 and moving.

5 Claims, 5 Drawing Sheets

Fig.4
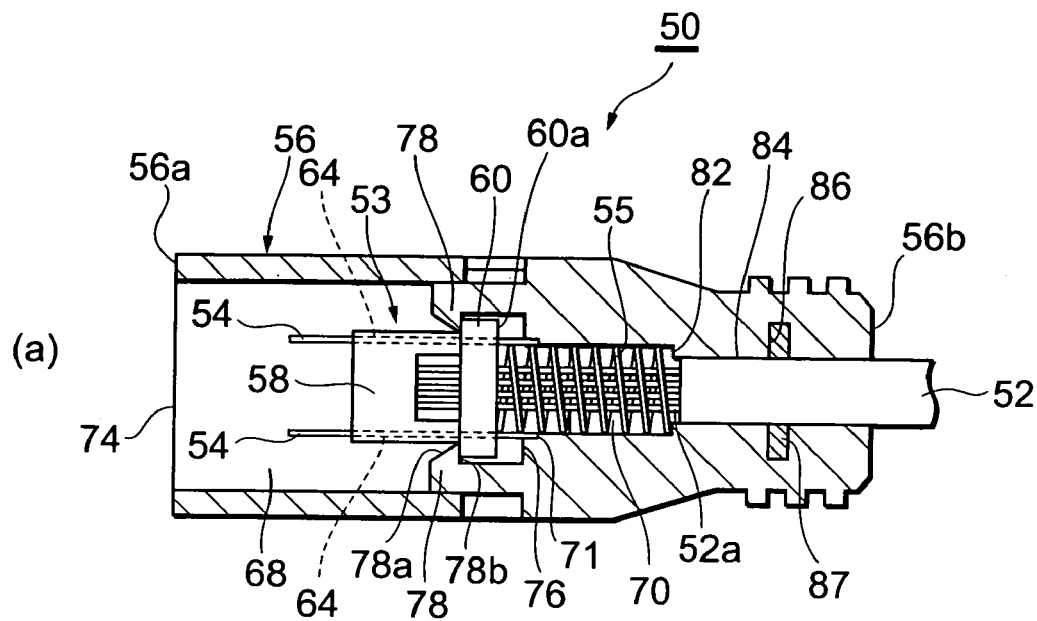
(a)
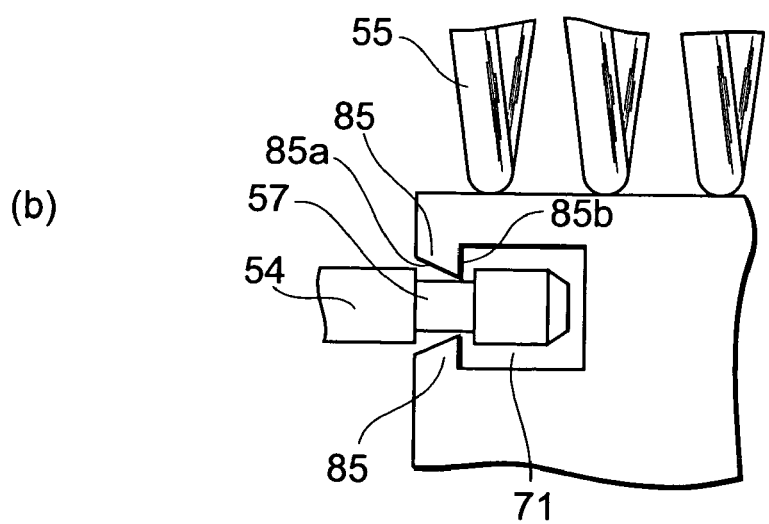
(b)

OPTICAL CONNECTOR AND METHOD FOR ASSEMBLING OPTICAL CONNECTOR

BACKGROUND OF THE INVENTION

1. Field of the Invention

The present invention relates to an optical connector that can be used when abutting and connecting optical fibers exposed from optical cables, and to a method for assembling the optical connector.

2. Related Background Art

A conventional optical connector is known that comprises, for example as described in Patent Document 1, a ferrule having a body portion (cylindrical body) and a collar portion (collar member), a stop ring that holds a rear end portion of the collar portion, a plug frame that holds a distal end portion of the collar portion, and a housing (plug housing) that covers the plug frame. In the conventional optical connector, the ferrule is positioned inside the optical connector by sandwiching the collar portion between the stop ring and the plug frame.

[Patent Document 1] Japanese Patent Application Laid-open No. 11-305075.

SUMMARY OF THE INVENTION

However, in the conventional optical connector, a plurality of parts, namely, the stop ring and plug frame, are required to position the ferrule. The resultant problem is that the production cost rises. Furthermore, because these parts are small, they are very difficult to assemble.

Accordingly, it is an object of the present invention to provide an optical connector that enables the reduction in the number of parts and can be easily attached to an optical cable.

MEANS FOR RESOLVING THE PROBLEM

The optical connector in accordance with the present invention is an optical connector that is attached to an optical cable in which an optical fiber is covered with a cable sheath, comprising: a ferrule that holds a distal end portion of the optical fiber exposed from the cable sheath; and a housing having in one end portion thereof a concave portion for a ferrule, which serves to accommodate the ferrule, wherein the ferrule has a body portion and a collar portion formed at one end side of the body portion and is introduced into the concave portion for a ferrule from the collar portion side, and a hook portion for a ferrule, which can be elastically deformed, is provided in a protruding condition at an inner wall surface extending between an opening and a bottom surface of the concave portion for a ferrule in the housing, and the hook portion for a ferrule is elastically deformed and guides the collar portion toward the bottom surface side of the concave portion for a ferrule when the ferrule is introduced into the concave portion for a ferrule, and is elastically restored and locks the collar portion when the collar portion reaches a space between the hook portion for a ferrule and the bottom surface of the concave portion for a ferrule.

In the optical connector in accordance with the present invention, the concave portion for a ferrule is formed in the housing, and the ferrule is inserted from the side of the collar portion into the concave portion for a ferrule. The hook portion for a ferrule is provided in a protruding condition inside the concave portion for a ferrule. The collar portion of the ferrule inserted into the concave portion for a ferrule is guided by the hook portion for a ferrule, which has been elastically deformed, and moves toward the bottom surface side of the concave portion for a ferrule. Where the collar portion reaches a space between the bottom surface of the concave portion for a ferrule and the hook portion for a ferrule, the hook portion for a ferrule is elastically restored. Therefore, even if the collar portion tries to move toward the opening of the concave portion for a ferrule, the collar portion is locked by the elastically restored hook portion for a ferrule and the movement is inhibited. As a result, the collar portion of the ferrule is positioned between the bottom surface of the concave portion for a ferrule and the hook portion for a ferrule. Thus, in accordance with the present invention, the ferrule can be positioned by inserting into the housing and moving. Therefore, no parts have to be prepared separately for positioning the ferrule and the operation of attaching to the optical cable can be easily performed.

Preferably, a guide pin for positioning that has a groove formed in an outer peripheral surface of one end portion thereof is further provided, the guide pin is inserted into the body portion and the collar portion of the ferrule, the one end portion of the guide pin protrudes from an end surface of the collar portion, the housing further has a concave portion for a pin, which is open at the bottom surface of the concave portion for a ferrule and serves to accommodate the one end portion of the guide pin, a hook portion for a pin is provided in a protruding condition in an open portion of the concave portion for a pin, and the hook portion for a pin is elastically deformed and guides the one end portion of the guide pin into the concave portion for a pin when one end portion of the guide pin is introduced into the concave portion for a pin, and is elastically restored and locks the groove of the guide pin when the groove of the guide pin reaches a position corresponding to the hook portion for a pin.

In the optical connector in accordance with the present invention, the concave portion for a pin is formed in the housing, and a hook portion for a pin is provided in the open portion of this concave portion for a pin. Because the hook portion for a pin guides one end portion of the guide pin into the concave portion for a pin, the one end of the guide pin is easily introduced into the concave portion for a pin. Where the groove of the guide pin reaches a position corresponding to the hook portion for a pin, the hook portion for a pin locks the groove, thereby holding the one end portion of the guide pin. Thus, in accordance with the present invention, the guide pin can be fixed to the housing by inserting into the concave portion for a pin.

The method for assembling an optical connector in accordance with the present invention comprises the steps of: preparing a ferrule comprising a body portion and a collar portion formed at one end side of the body portion; preparing a housing comprising a concave portion for a ferrule, which serves to accommodate the ferrule at one end side and provided with locking means for locking the ferrule; inserting one end portion of an optical cable into the housing; inserting an optical fiber exposed by removing a cable sheath at one end portion of the optical cable into the ferrule and fixing; and introducing the ferrule from the collar portion side into the concave portion for a ferrule of the housing and locking the collar portion with the locking means.

With the method for assembling an optical connector in accordance with the present invention, the ferrule holding the end portion of the optical fiber is introduced into the concave portion for a ferrule of the housing and the collar portion of the ferrule is locked by the locking means of the housing, whereby the ferrule is positioned with respect to the housing. Therefore, no parts have to be prepared separately for positioning the ferrule and the operation of attaching to the optical cable can be easily performed.

Preferably, a cable insertion hole for inserting the optical cable is provided between the bottom surface of the concave portion for a ferrule and the other end of the housing in the housing, and there is further provided a cable fixing member that fixes the position of the optical cable inserted into the cable insertion hole by caulking from outside.

In this case, because, the optical cable extending from the ferrule is also positioned and fixed, the ferrule can be positioned with even better reliability.

Preferably, the housing is composed of a PBT resin. Further, it is preferred that the housing be composed of a material having heat resistance, rigidity, electric properties, and moldability similar to those of the PBT resin. In this case, the housing excels in heat resistance, rigidity, electric properties, and moldability and is, therefore, optimum for long-term use.

EFFECT OF THE INVENTION

The present invention can provide an optical connector that enables the reduction in the number of parts and can be easily attached to an optical cable. Therefore, the production cost can be reduced and the attachment to the optical cable can be performed smoothly.

BRIEF DESCRIPTION OF THE DRAWINGS

FIG. 4 is a cross-sectional view in the horizontal direction of the socket-type optical connector of the second embodiment.

DESCRIPTION OF THE PREFERRED EMBODIMENTS

The preferred embodiments of the present invention will be described below in greater details with reference to the appended drawings. In the explanation below, identical elements or elements having identical functions will be assigned with identical reference symbols and redundant explanation thereof will be omitted.

Figure 1:
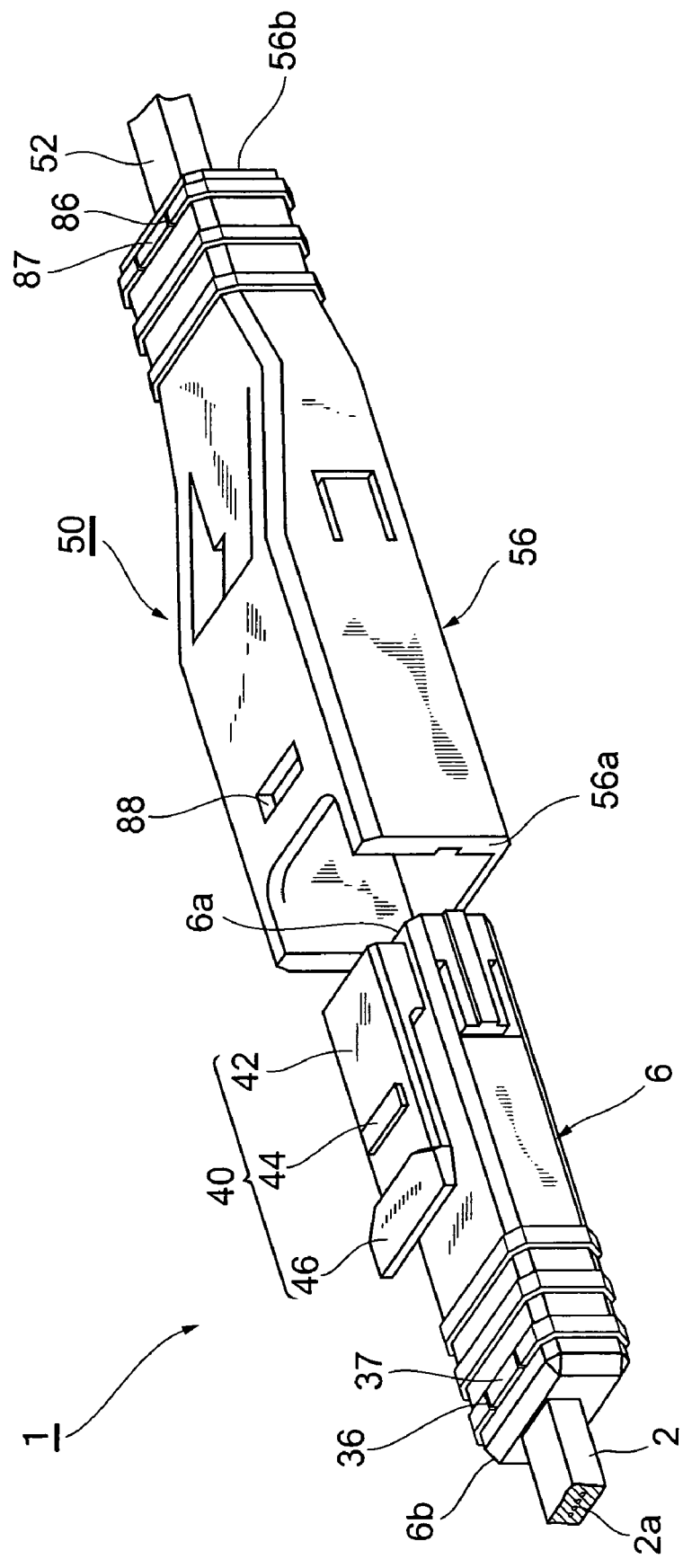
FIG. 1 is a perspective view illustrating a plug-type optical connector of the first embodiment and a socket type optical connector of the second embodiment.
Figure 2:
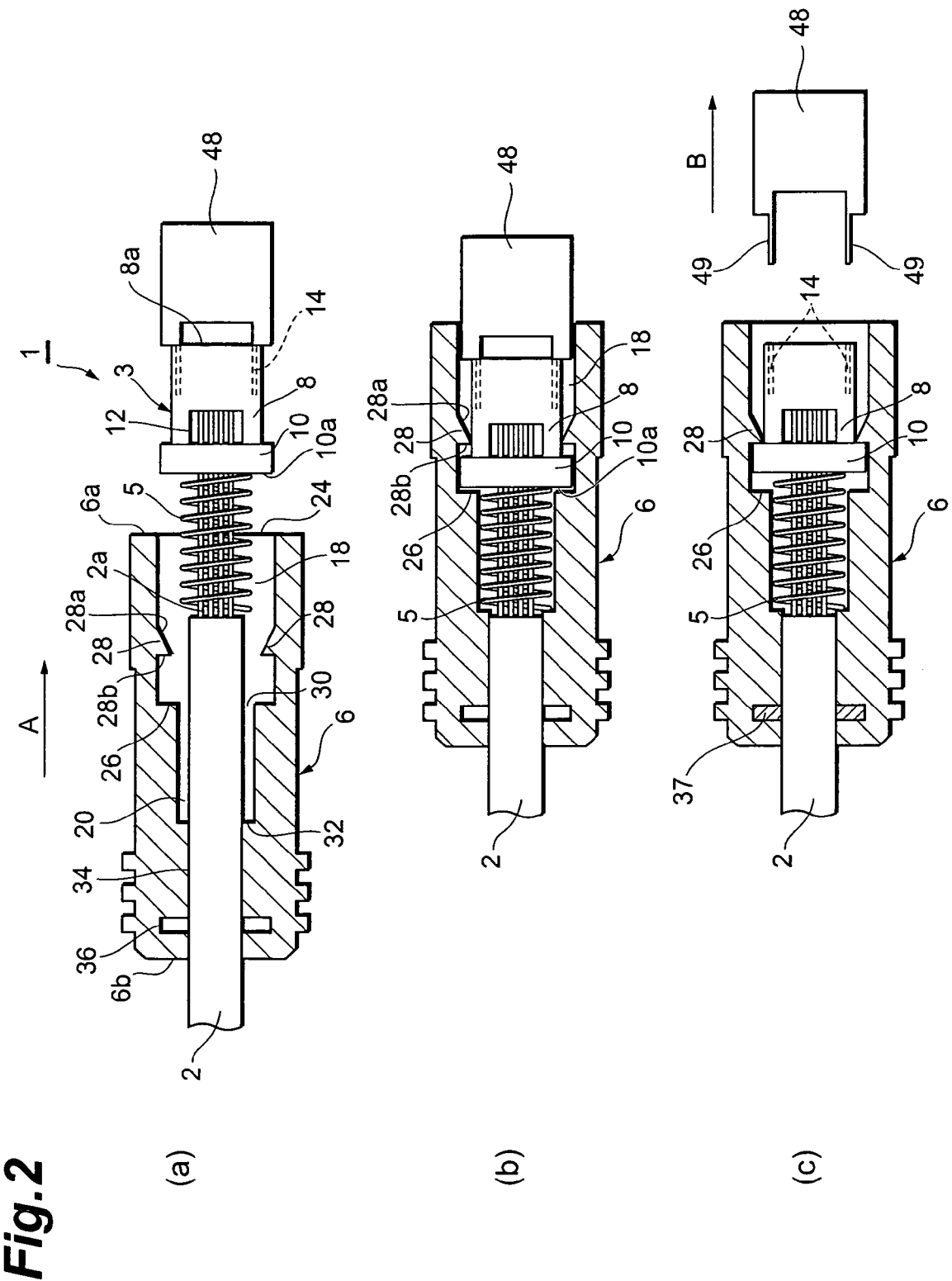
FIG. 2 is a cross-sectional view in the horizontal direction of the plug-type optical connector of the first embodiment, this figure serving to explain a process of attaching to an optical cable.
Figure 3:
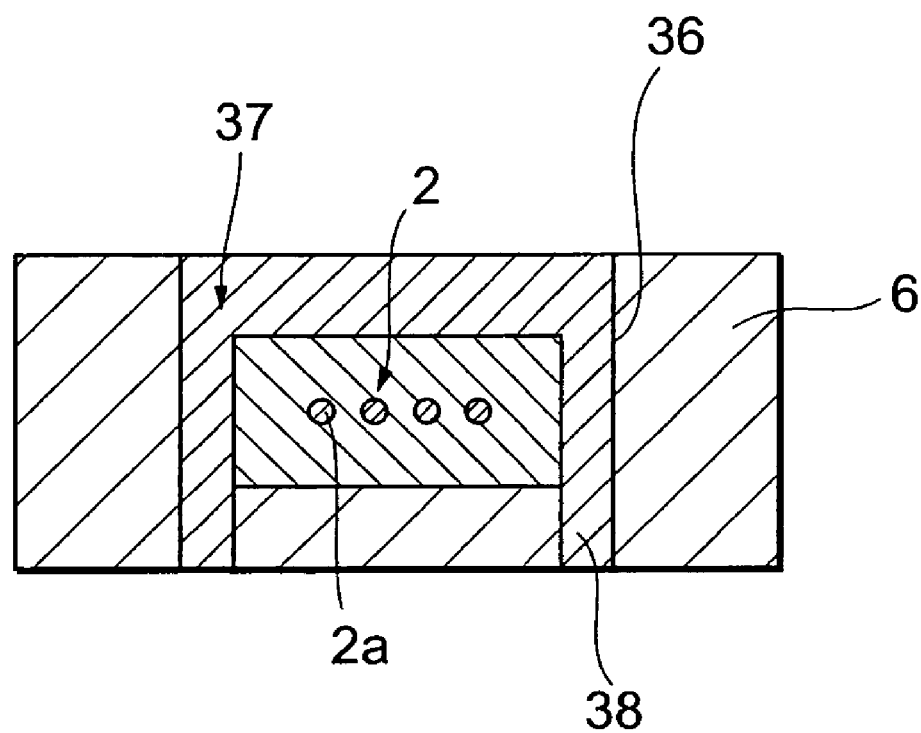
FIG. 3 is a cross-sectional view in the vertical direction of the plug-type optical connector of the first embodiment.
Figure 5:
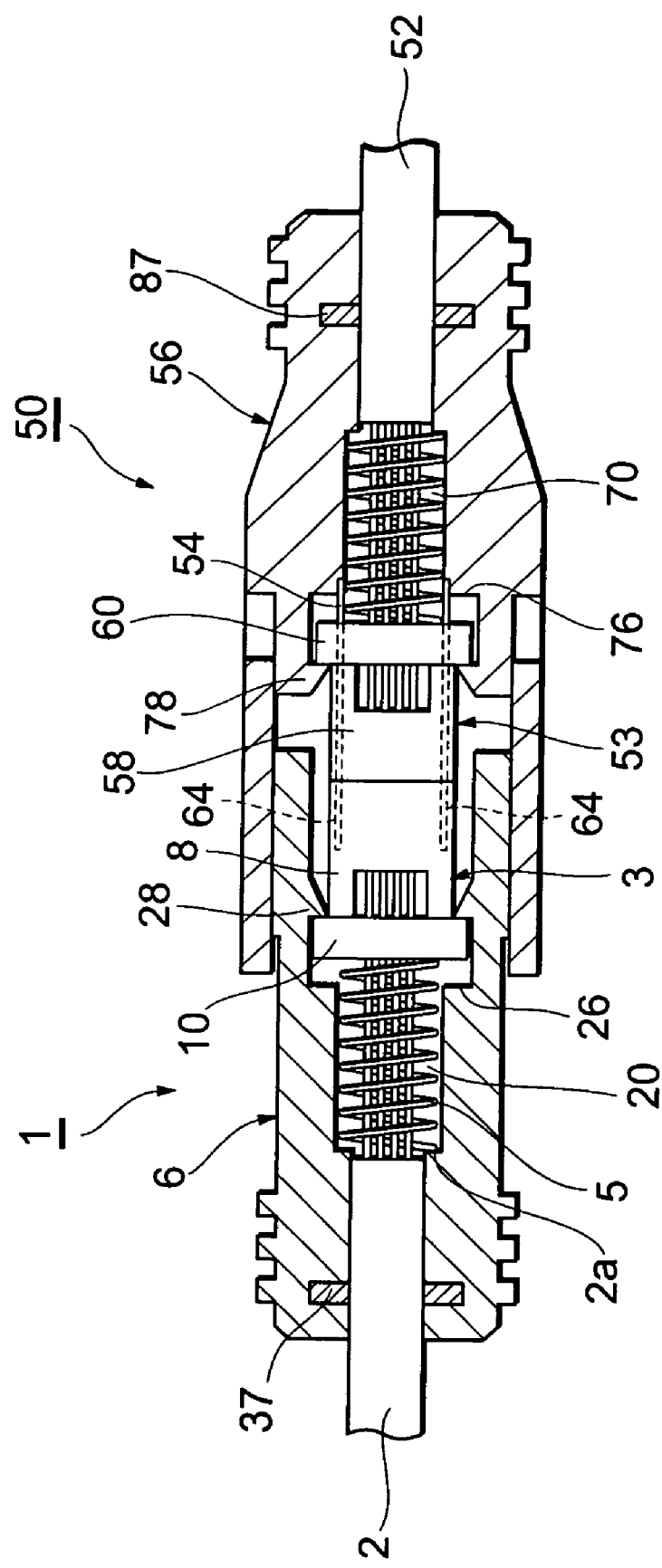
FIG. 5 is a cross-sectional view in the horizontal direction illustrating the connected state of the plug-type optical connector of the first embodiment and the socket-type optical connector of the second embodiment.

FIG. 1 is a perspective view illustrating a plug-type optical connector of the first embodiment and a socket type optical connector of the second embodiment. FIG. 2 is a cross-sectional view in the horizontal direction of the plug-type optical connector of the first embodiment, this figure serving to explain a process of attaching to an optical cable. FIG. 3 is a cross-sectional view in the vertical direction of the plug-type optical connector of the first embodiment. FIG. 4 is a cross-sectional view in the horizontal direction of the socket-type optical connector of the second embodiment. FIG. 5 is a cross-sectional view in the horizontal direction illustrating the connected state of the plug-type optical connector of the first embodiment and the socket-type optical connector of the second embodiment. Further, the plug-type optical connector of the first embodiment will be explained, and then the socket-type optical connector of the second embodiment will be explained.

As shown in FIG. 1, the plug-type optical connector 1 of the first embodiment is an optical connector that will be attached to an optical cable 2 in which an optical fiber 2a is covered with a cable sheath. The plug-type optical connector 1, as shown in FIG. 2, comprises a ferrule 3, a compression coil spring (elastic member) 5, and a plug housing (housing) 6.

The ferrule 3 serves to hold a distal end portion of the optical fiber 2a. More specifically, it is an MT connector ferrule. The ferrule 3 has a body portion 8 and a collar portion 10 formed integrally with one end side of the body portion 8. Because the collar portion 10 protrudes from the body portion 8, a step is configured between the collar portion 10 and body portion 8.

Through optical fiber insertion holes (not shown in the figures) for inserting the optical fiber 2a are formed in the body portion 8 and collar portion 10. The optical fiber insertion hole is opened in a distal end surface 8a of the body portion 8 and a rear end surface 10a of the collar portion 10. Further, a pair of guide pin insertion holes 14 are formed in the body portion 8. The guide pin insertion holes 14 are positioned on both sides of the optical fiber insertion hole and opened in the distal end surface 8a of the body portion 8. As shown in FIG. 5, guide pins 54 for alignment are inserted in respective guide pin insertion holes 14.

An open portion 12 is formed in the upper wall portion of the body portion 8. The open portion 12 is positioned directly above the optical fiber insertion hole, and the optical fiber 2a inserted into the optical fiber insertion hole can be fixed to the ferrule 3 by pouring an adhesive from the open portion 12.

The ferrule 3 having the above-described configuration is accommodated in the plug housing 6 as shown in (c) of FIG. 2. The plug housing 6 has a concave portion 18 for a ferrule, which serves to accommodate the ferrule 3 and a concave portion 20 for a spring (concave portion for an elastic member) for accommodating the compression coil spring 5 between one end 6a and another end 6b.

The concave portion 18 for a ferrule is formed in one end portion of the plug housing 6. The concave portion 18 for a ferrule is opened at one end surface of the plug housing 6, and a plurality (two in the present embodiment) of hook portions 28 (locking means) for a ferrule are provided in a protruding condition at the inner wall surface extending between an opening 24 and a bottom surface 26 of the concave portion 18 for a ferrule.

A hook portion 28 for a ferrule has a guide surface 28a for guiding the ferrule 3 toward the bottom surface 26 of the concave portion 18 for a ferrule and a locking surface 28b for locking the ferrule 3 and can be elastically deformed in the width direction of the plug housing 6. The guide surface 28a is so inclined as to withdraw from the base of the hook portion 28 for a ferrule as the bottom surface 26 (left side in FIG. 2) of the concave portion 18 for a ferrule is approached. The locking surface 28b faces the bottom surface 26 of the concave portion 18 for a ferrule and is almost perpendicular to the installation surface of the hook portion 28 for a ferrule.

The concave portion 20 for a spring is formed between the concave portion 18 for a ferrule and the other end 6b of the plug housing 6 and opened at the bottom surface 26 of the concave portion 18 for a ferrule. The length from the opening 30 of the concave portion 20 for a spring to the bottom surface 32 of the concave portion 20 for a spring is shorter than the natural length of the compression coil spring 5. The compression coil spring 5 disposed in the concave portion 20 for a spring is abutted by one end thereof against the rear end surface 10a of the collar portion 10 of the ferrule 3 and abutted by the other end against the bottom surface 32 of the concave portion 20 for a spring.

A cable insertion hole 34 is formed between the concave portion 20 for a spring and the other end 6b of the plug housing 6. The cable insertion hole 34 serves to insert the optical cable 2 in a linearly extending state thereof and is opened at the bottom surface 32 of the concave portion 20 for a spring and at the other end surface of the plug housing 6.

As shown in FIG. 1, an open portion 36 is formed in an upper wall portion of the plug housing 6. The open portion 36 is positioned directly above the cable insertion hole 34. As also shown in FIG. 5, a cable fixing member 37 is fitted in this open portion 36. The cable fixing member 37 is a member for fixing the optical cable 2 and has a pair of leg portions 38 provided with a sharp edge (not shown in the figure). Where such cable fixing member 37 is inserted from the open portion 36 and the sharp edges of the leg portions 38 of the cable fixing member 37 penetrate into the cable sheath of the optical cable 2, the optical cable 2 can be fixed to the plug housing 6.

As shown in FIG. 1, a latch portion 40 that maintains a joined state of the plug housing 6 and the below-described socket housing 56 is provided integrally with the upper wall portion of the plug housing 6. The latch portion 40 includes a latch arm 42 extending from one end 6a of the plug housing 6 to the other end 6b. One end of the latch arm 42 is fixed in the vicinity of one end 6a of the plug housing 6. Further, the latch arm 42 can be deformed elastically in the direction crossing the plug housing 6. A locking hook 44 that engages with the socket housing 56 is provided in a protruding condition at the outer surface of the latch arm 42, that is, at the surface facing the plug housing 6. Further, a knob 46 for releasing the engagement of the locking hook 44 with the socket housing 56 is provided at the other end of the latch arm 42.

The plug housing 6 having the above-described configuration is composed of a PBT resin. Where the PBT resin is used, the plug housing 6 excels in heat resistance, rigidity, electric properties, and moldability and is, therefore, optimum for long-term use. The material of the plug housing 6 is not limited to a PBT resin, and any material having heat resistance, rigidity, electric properties, and moldability similar to those of the PBT resin may be used. Examples of such materials include polyetherimides and polyamidoimides.

A method for attaching the plug-type optical connector 1 to the optical cable 2 will be explained below with reference to FIG. 2. First, the optical cable 2, ferrule 3, compression coil spring 5, and plug housing 6 are prepared. One end portion of the prepared optical cable 2 is introduced in the cable insertion hole 34 of the plug housing 6 and guided out from the opening 24 formed in one end 6a of the plug housing 6 via the cable insertion hole 34, concave portion 20 for a spring, and concave portion 18 for a ferrule. The compression coil spring 5 is fit onto a portion of the optical cable 2 that has been taken out from the opening 24.

Then, the cable sheath at one end portion of the optical cable 2 is removed and the optical fiber 2a is exposed. The exposed optical fiber 2a is inserted into an optical fiber insertion hole (not shown in the figure) of the ferrule 3. The optical fiber 2a is introduced from the rear end surface 10a of the collar portion 10. After the optical fiber 2a has been inserted, an adhesive is poured from the open portion 12 of the ferrule 3 and the optical fiber 2a is fixed to the ferrule 3. In this state, the ferrule 3 is not connected to the plug housing 6, and the plug housing 6 can move along the optical cable 2.

A jig 48 is then prepared. The jig 48 serves to push the ferrule 3 into the plug housing 6 and has a pair of protruding portions 49. The protruding portions 49 will be fitted into the pair of guide pin insertion holes 14 formed in the ferrule 3 and have a diameter and length enabling the insertion into the guide pin insertion holes 14. In the ferrule 3, an optical fiber insertion hole is provided between the guide pin insertion hole 14 and the guide pin insertion hole 14, and the end surface of the optical fiber 2a inserted into the optical fiber insertion hole is exposed from the distal end surface 8a of the body portion 8. The zone between the protruding portion 49 and the protruding portion 49 of the jig 48 has a concave shape and prevents the jig 48 from coming into contact with the end surface of the optical fiber 2a exposed from the distal end surface 8a.

As shown in (a) of FIG. 2, the protruding portions 49 of the prepared jig 48 are inserted into the guide pin insertion holes 14 of the ferrule 3. Upon insertion, the plug housing 6 is moved in the direction of arrow A, that is, in the direction for approaching the jig 48. As the plug housing 6 moves, the ferrule 3 is introduced from the side of the collar portion 10 into the concave portion 18 for a ferrule of the plug housing 6.

The ferrule 3 introduced into the concave portion 18 for a ferrule is moved in relation to the bottom surface 26 of the concave portion 18 for a ferrule by the movement of the plug housing 6. As a result, the collar portion 10 of the ferrule 3 is abutted against the guiding surfaces 28a of two hook portions 28 for a ferrule. Upon the abutment, as the plug housing 6 moves further, the inclined guiding surface 28a is pushed by the collar portion 10 and the hook portion 28 for a ferrule is elastically deformed. As a result, the space between the guiding surface 28a of one hook portion 28 for a ferrule and guiding surface 28a of another hook portion 28 for a ferrule is expanded by the collar portion 10. As the plug housing 6 moves, the collar portion 10 moves toward the bottom surface 26 of the concave portion 18 for a ferrule, while expanding the space between the guiding surface 28a and the guiding surface 28a. At this time, the inclined guiding surface 28a serves to guide the collar portion 10 toward the bottom surface 26.

Where the collar portion 10 reaches the space between the bottom surface 26 of the concave portion 18 for a ferrule and the hook portion 28 for a ferrule, following the subsequent movement of the plug housing 6, the guiding surface 28a is released from the push-down state. As a result, the hook portion 28 for a ferrule is elastically restored. As shown in (b) of FIG. 2, once the hook portion 28 for a ferrule is elastically restored, the movement of the plug housing 6 is stopped. At this time, the compression coil spring 5 is accommodated in the concave portion 20 for a spring.

After the movement of the plug housing 6 has been stopped, as shown in (c) of FIG. 2, the jig 48 is moved in the direction of arrow B, that is, in the direction of withdrawing from the plug housing 6, and the protruding portions 49 are pulled out from the guide pin insertion holes 14. As a result, the pressure applied to the ferrule 3 from the jig 48 is reduced. Instead, the ferrule 3 is biased by the compression coil spring 5. As a result, the collar portion 10 of the ferrule 3 is pushed toward the hook portion 28 for a ferrule and comes into contact with the locking surface 28b of the hook portion 28 for a ferrule. The locking surface 28b stops the collar portion 10, and the ferrule 3 biased by the compression coil spring 5 is prevented from jumping out from the opening 24 of the concave portion 18 for a ferrule.

After the jig 48 has been separated from the ferrule 3, the cable fixing member 37 is inserted into the open portion 36 of the plug housing 6, and the leg portions 38 of the cable fixing member 37 are caused to penetrate into the cable sheath of the optical cable 2. The optical cable 2 is thus caulked from outside and fixedly positioned, whereby the ferrule 3 can be more reliably positioned inside the concave portion 18 for a ferrule.

As described hereinabove, in the plug-type optical connector 1 of the present embodiment, the concave portion 18 for a ferrule is formed in the plug housing 6, and the ferrule 3 is inserted from the side of the collar portion 10 into the concave portion 18 for a ferrule. The hook portion 28 for a ferrule is provided in a protruding condition inside the concave portion 18 for a ferrule, and the collar portion 10 inserted into the concave portion 18 for a ferrule is guided by the hook portion 28 for a ferrule, which has been elastically deformed and moves toward the bottom surface 26 of the concave portion 18 for a ferrule. Where the collar portion 10 reaches the space between the bottom portion 26 of the concave portion 18 for a ferrule and the hook portion 28 for a ferrule, the hook portion 28 for a ferrule is elastically restored. As a result, even if the collar portion 10 of the ferrule 3 moves toward the opening 24 of the concave portion 18 for a ferrule, it is locked by the elastically restored hook portion 28 for a ferrule and the movement thereof is inhibited. Thus, in the plug-type optical connector 1 of the present embodiment, the ferrule 3 can be positioned by inserting into the concave portion 18 for a ferrule located inside the plug housing 6 and moving toward the bottom surface 26. As a result, no parts have to be prepared separately for positioning the ferrule 3 and the operation of attaching to the optical cable 2 can be easily performed.

Further, in the plug-type optical connector 1 of the present embodiment, the compression coil spring 5 accommodated in the concave portion 20 for a spring biases the collar portion 10 of the ferrule 3 accommodated between the bottom surface 26 of the concave portion 18 for a ferrule and the hook portion 28 for a ferrule toward the hook portion 28 for a ferrule. By pushing the collar portion 10 against the hook portion 28 for a ferrule, it is possible to fix reliably the position of the ferrule 3. However, by contrast with a complete position fixing, a certain degree of movement is allowed for the ferrule 3. As a result, when the optical fiber 2a held in the ferrule 3 is connected to an optical fiber held in another ferrule, stresses applied to the connection portion can be reduced.

A socket-type optical connector of the second embodiment will be described below.

As shown in FIG. 1, a socket-type optical connector 50 of the present embodiment is an optical connector that will be attached to an optical cable 52 in which an optical fiber 52a is covered with a cable sheath. The socket-type optical connector 50, as shown in FIG. 4, comprises a ferrule 53, a guide pin 54, a compression coil spring (elastic member) 55, and a socket housing (housing) 56.

The ferrule 53 serves to hold a distal end portion of the optical fiber 52a and is a MT ferrule that is usually used. The ferrule 53 has a configuration substantially identical to that of the ferrule 3 in the plug-type optical connector 1 of the first embodiment. A body portion 58 of the ferrule 53 is equivalent to the body portion 8 of the ferrule 3, and a collar portion 60 of the ferrule 53 is equivalent to the collar portion 10 of the ferrule 3.

A pair of guide pin insertion holes 64 are formed in the ferrule 53. By contrast with the guide pin insertion holes 14 of ferrule 3, the guide pin insertion holes 64 of the ferrule 53 are formed through the body portion 58 and collar portion 60.

A guide pint 54 is inserted into the guide pin insertion hole 64. The length of the guide pin 54 is larger than that of the guide pin insertion hole 64. As a result, one end portion of the guide pin 54 protrudes from a rear end surface (end surface) 60a of the collar portion 60. As shown in (b) of FIG. 4, a groove 57 is formed in an outer peripheral surface of one end portion of the guide pin 54.

The socket housing 56 is composed of a material identical to that of the plug housing 6 of the plug-type optical connector 1 and configured so that can be mated with the plug housing 6. The socket housing 56 has, between one end 56a and the other end 56b, a concave portion 68 for a ferrule, which serves to accommodate the ferrule 53, a concave portion for a spring (concave portion for an elastic member) 70 that serves to accommodate a compression coil spring 55, and a concave portion for a pin (concave portion for a pin) 71 that serves to accommodate one end portion of the guide pin 54.

The concave portion 68 for a ferrule is formed in one end portion of the socket housing 56 and, as shown in FIG. 5, has a size enabling the insertion of one end portion of the plug housing 6 of the plug-type optical connector 1. The concave portion 68 for a ferrule is open at one end surface of the socket housing 56, and a plurality (two in the present embodiment) hook portions 78 for a ferrule are provided in a protruding condition at the inner wall surface extending between the opening 74 and the bottom surface 76.

The hook portion 78 for a ferrule has a guide surface 78a for guiding the ferrule 53 toward the bottom surface 76 of the concave portion 68 for a ferrule and a locking surface 78b for locking the ferrule 3 to the concave portion 18 for a ferrule and can be elastically deformed in the width direction of the socket housing 56. The guide surface 78a is so inclined as to withdraw from the base of the hook portion 78 for a ferrule as the bottom surface 76 (right side in FIG. 4) of the concave portion 68 for a ferrule is approached. The locking surface 78b faces the bottom surface 76 of the concave portion 68 for a ferrule and is almost perpendicular to the installation surface of the hook portion 78 for a ferrule.

The concave portion 70 for a spring is formed between the concave portion 68 for a ferrule and the other end 56b of the socket housing 56 and opened at the bottom surface 76 of the concave portion 68 for a ferrule. The length from the opening of the concave portion 70 for a spring to the bottom surface 82 of the concave portion 70 for a spring is shorter than the natural length of the compression coil spring 55. The compression coil spring 55 disposed in the concave portion 70 for a spring is abutted by one end thereof against the rear end surface 60a of the collar portion 60 of the ferrule 53 and abutted by the other end against the bottom surface 82 of the concave portion 70 for a spring.

In the socket housing 56, a cable insertion hole 84 is formed between the concave portion 70 for a spring and the other end 56b of the socket housing 56. The cable insertion hole 84 serves to insert the optical cable 52 in a linearly extending state thereof and is opened at the bottom surface 82 of the concave portion 70 for a spring and at the other end surface of the socket housing 56.

The concave portion 71 for a pin is formed between the concave portion 68 for a ferrule and the other end 56b of the socket housing 56 and open at the bottom surface 76 of the concave portion 68 for a ferrule. Two concave portions 71 for a pin are formed on both sides of the concave portion 70 for a spring.

As shown in (b) of FIG. 4, a plurality (two in the present embodiment) hook portions 85 for a pin are provided in a protruding condition in an open portion of the concave portion 71 for a pin. The hook portions 85 for a pin are engaged with the groove 57 of the guide pin 54. In the hook portion 85 for a pin, a surface 85a positioned on the outside of the concave portion 71 for a pin is an inclined surface such as to guide one end portion of the guide pin 54 into the concave portion 71 for a pin. On the other hand, a surface 85b positioned inside the concave portion 71 for a pin is almost perpendicular to the installation surface of the hook portion 78 for a ferrule.

As shown in FIG. 1, an open portion 86 is formed in an upper wall portion of the socket housing 56. The open portion 86 serves to insert the cable fixing member 87 and is positioned directly above the cable insertion hole 84. The cable fixing member 87 has a configuration similar to that of the cable fixing member 37 in the plug-type optical connector 1 of the first embodiment. Further, window portions 88 for locking and receiving that will engage with the locking hooks 44 of the latch portion 40 provided in the plug-type optical connector 1 of the first embodiment are provided in the upper wall portion of the socket housing 56.

A method for attaching the socket-type optical connector 50 to the optical cable 52 is similar to the method for attaching the plug-type optical connector 1 of the first embodiment to the optical cable 2. However, the difference with the first embodiment is in that the guide pin 54 is attached after the collar portion 60 of the ferrule 53 has been locked by the locking surface 78b of the hook portion 78 for a ferrule.

Explaining more specifically, after the collar portion 60 of the ferrule 53 has been locked by the locking surface 78b of the hook portion 78 for a ferrule, the guide pin 54 is passed into the guide pin insertion hole 64 of the body portion 58 in the ferrule 53 and one end portion thereof is caused to protrude from the rear end surface 60a of the collar portion 60 and introduced into the concave portion 71 for a pin. As it is introduced therein, the inclined surface 85a of the hook portion 85 for a pin is pushed by one end portion of the guide pin 54, whereby the hook portion 85 for a pin is elastically deformed. As a result, the space between the surface 85a of one hook portion 85 for a pin and the surface 85a of another hook portion 85 for a pin is expanded by the guide pin 54. At this time, the inclined surface 85a serves to guide one end portion of the guide pin 54 into the concave portion 71 for a pin.

Where the groove 57 of the guide pin 54 reaches the position corresponding to the hook portion 85 for a pin, the surface 85a of the hook portion 85 for a pin is released from the push-down state. As a result, the hook portion 85 for a pin is elastically restored. The elastically restored hook portion 85 for a pin engages with the groove 57 of the guide pin 54. Because the surface 85b of the hook portion 85 for a pin abuts against the circumferential wall surface of the groove 57 of the guide pin 54, the one end portion of the guide pin 54 is prevented from being pulled out from the concave portion 71.

As described hereinabove, in the socket-type optical connector 50 of the present embodiment, the concave portion 68 for a ferrule is formed in the socket housing 56, and the hook portion 78 for a ferrule is provided in the concave portion 68 for a ferrule. Therefore, similarly to the plug-type optical connector 1 of the first embodiment, no parts have to be prepared separately for positioning the ferrule 53 and the operation of attaching to the optical cable 52 can be easily performed.

Further, in the socket-type optical connector 50 of the present embodiment, the concave portion 71 for a pin is formed in the socket housing 56, and a hook portion 85 for a pin is provided in the open portion of the concave portion 71 for a pin. Because the hook portion 85 for a pin guides one end portion of the guide pin 54 into the concave portion 71 for a pin, the one end portion of the guide pin 54 can be easily introduced into the concave portion 71 for a pin. Where the groove 57 of the guide pin 54 reaches the position corresponding to the hook portion 85 for a pin, the hook portion 85 for a pin locks the groove 57. Therefore, the guide pin 54 can be fixed to the socket housing 56.

The preferred embodiments of the present invention are explained hereinabove, but the present invention is not necessarily limited to these embodiments.

For example, as shown in FIGS. 1, 2, 5, non-through guide pin insertion holes 14 are formed in the ferrule 3 of the plug-type optical connector 1. They may be through holes similarly to the guide pin insertion holes 64 of the ferrule 53 provided in the socket-type optical connector 50. In this case, it is preferred that a concave portion similar to the concave portion for a pin of the socket housing 56 be also formed in the plug housing 6 and that the other end portion of the guide pin protruding from the rear end surface 10a of the collar portion 10 be held in the concave portion for a pin.

Further, in the present embodiments, the optical cables 2, 52 are fixed using cable fixing members 37, 87, but the optical cables 2, 52 may be also inserted into the other end portions of the plug housing 6 and socket housing 56 and fixed using rubber booths having insertion holes for inserting the optical cables 2, 52.

What is claimed is:

1. An optical connector that is attached to an optical cable in which an optical fiber is covered with a cable sheath, the optical connector comprising:

a ferrule that holds a distal end portion of the optical fiber exposed from the cable sheath; and a one piece molded housing having in one end portion thereof a first concave portion for the ferrule, which serves to accommodate the ferrule, wherein the ferrule has a body portion and a collar portion formed at one end side of the body portion and is introduced into the first concave portion for the ferrule from the collar portion side, a hook portion for the ferrule, which is made of an elastically deformable material, is provided in a protruding condition at an inner wall surface extending between an opening and a bottom surface of the first concave portion for the ferrule in the housing, and the hook portion for the ferrule is elastically deformed and guides the collar portion toward the bottom surface of the first concave portion for the ferrule when the ferrule is introduced into the first concave portion for the ferrule, and is elastically restored and locks the collar portion when the collar portion reaches a space between the hook portion for the ferrule and the bottom surface of the first concave portion for the ferrule, the housing includes a second concave portion for an elastic member, which is open at the bottom surface of the first concave portion for the ferrule and accommodates the elastic member, and the elastic member accommodated in the second concave portion for the elastic member biases the collar portion of the ferrule accommodated between the hook portion for the ferrule and the bottom surface of the first concave portion for the ferrule toward the hook portion for the ferrule, and a bottom surface of the second concave portion against which the elastic member is pushed is formed in the one piece molded housing.

2. The optical connector according to claim 1, further comprising a guide pin for positioning, which has a groove formed in an outer peripheral surface of one end portion thereof, wherein the guide pin is inserted into the body portion and the collar portion of the ferrule, and the one end portion of the guide pin protrudes from an end surface of the collar portion, the housing further has a concave portion for a pin, which is open at the bottom surface of the first concave portion for a ferrule and serves to accommodate the one end portion of the guide pin, and a hook portion for a pin is provided in a protruding condition in an open portion of the concave portion for a pin, and the hook portion for a pin is elastically deformed and guides the one end portion of the guide pin into the concave portion for a pin when one end portion of the guide pin is introduced into the concave portion for a pin, and is elastically restored and locks the groove of the guide pin when the groove of the guide pin reaches a position corresponding to the hook portion for a pin.

3. The optical connector according to claim 1, wherein a diameter of the first concave portion is larger than a diameter of the second concave portion.

4. The optical connector according to claim 1, wherein a cable insertion hole for inserting the optical cable is provided between the bottom surface of the first concave portion for the ferrule and the other end of the housing in the housing, and the optical connector is further provided with a cable fixing member that fixes a position of the optical cable inserted into the cable insertion hole by caulking from outside.

5. A method for assembling an optical connector, comprising the steps of:

preparing a ferrule comprising a body portion and a collar portion formed at one end side of the body portion;

preparing a one piece molded housing comprising:
a first concave portion for the ferrule, which serves to accommodate the ferrule, at one end side and provided with locking means for locking the ferrule;
a second concave portion for an elastic member;

inserting one end portion of an optical cable into the housing;

inserting an optical fiber exposed by removing a cable sheath at one end portion of the optical cable into the ferrule and fixing;

introducing the ferrule from the collar portion side into the first concave portion for the ferrule of the housing and locking the collar portion with the locking means; and accommodating the elastic member into the second concave portion for the elastic member, wherein the elastic member is pushed against a bottom surface of the second concave portion formed in the one piece molded housing.

* * * * *